(12) United States Patent
Kim et al.

(10) Patent No.: US 11,358,322 B2
(45) Date of Patent: Jun. 14, 2022

(54) POUCH MOLDING METHOD AND APPARATUS

(71) Applicant: LG Chem, Ltd., Seoul (KR)

(72) Inventors: Sung Hyun Kim, Daejeon (KR); Woo Yong Lee, Daejeon (KR); Kieun Sung, Daejeon (KR); Hyun Il Kim, Daejeon (KR); Byung Jun Ahn, Daejeon (KR); Tae Hyun Kim, Daejeon (KR); Sung Gyu Kim, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/478,613

(22) PCT Filed: Nov. 16, 2018

(86) PCT No.: PCT/KR2018/014134
§ 371 (c)(1),
(2) Date: Jul. 17, 2019

(87) PCT Pub. No.: WO2019/107814
PCT Pub. Date: Jun. 6, 2019

(65) Prior Publication Data
US 2020/0282627 A1    Sep. 10, 2020

(30) Foreign Application Priority Data
Nov. 28, 2017   (KR) .......................... 10-2017-0160098

(51) Int. Cl.
*B29C 51/08*           (2006.01)
*B29C 51/14*           (2006.01)
(Continued)

(52) U.S. Cl.
CPC ............ *B29C 51/087* (2013.01); *B29C 51/14* (2013.01); *B29C 51/262* (2013.01);
(Continued)

(58) Field of Classification Search
None
See application file for complete search history.

(56) References Cited

U.S. PATENT DOCUMENTS

| 3,584,109 A | 6/1971 | Meadors et al. |
| 9,074,405 B2 * | 7/2015 | Shim ................... F25D 23/028 |

(Continued)

FOREIGN PATENT DOCUMENTS

| EP | 2813339 A1 | 12/2014 |
| JP | 2008-212995 A | 9/2008 |

(Continued)

OTHER PUBLICATIONS

Extended European Search Report from European Application No. 18883315.6, dated Jan. 22, 2020, 3 pages.
(Continued)

*Primary Examiner* — Monica A Huson
(74) *Attorney, Agent, or Firm* — Lerner, David, Littenberg, Krumholz & Mentlik, LLP

(57) ABSTRACT

To solve the above problems, a pouch molding method according to an embodiment of the present invention includes: a seating step of seating a pouch film on a top surface of a die; a stripper descending step of allowing a stripper disposed above the die to descend; a fixing step of fixing the pouch film using the stripper; a molding preparation step of allowing a Blank holder disposed at a central portion of the die to ascend to contact one surface of the pouch film and allowing a punch disposed at a central portion of the stripper to descend to contact the other surface of the pouch film; and a molding step of allowing the punch and the Blank holder to descend along with each other to form a cup part in the pouch film.

18 Claims, 12 Drawing Sheets

(51) Int. Cl.
  *B29C 51/26* (2006.01)
  *B29K 23/00* (2006.01)
  *B29K 67/00* (2006.01)
  *B29L 31/34* (2006.01)
  *B29L 31/00* (2006.01)
(52) U.S. Cl.
  CPC .... *B29K 2023/12* (2013.01); *B29K 2067/003* (2013.01); *B29K 2905/02* (2013.01); *B29K 2995/0067* (2013.01); *B29L 2031/3468* (2013.01); *B29L 2031/7146* (2013.01)

(56) References Cited

U.S. PATENT DOCUMENTS

| | | |
|---|---|---|
| 2001/0053394 A1 | 12/2001 | Oster |
| 2009/0274957 A1 | 11/2009 | Goda et al. |
| 2010/0187291 A1* | 7/2010 | Kriegner ................ C21D 8/04 228/173.6 |

FOREIGN PATENT DOCUMENTS

| | | |
|---|---|---|
| JP | 2009-037979 A | 2/2009 |
| KR | 20110011734 A | 2/2011 |
| KR | 10-1119070 B1 | 3/2012 |
| KR | 10-1154856 B1 | 6/2012 |
| KR | 10-2013-0132093 A | 12/2013 |
| KR | 10-2017-0124882 A | 11/2017 |

OTHER PUBLICATIONS

Chinese Search Report for Application No. 201880016029.5, dated Dec. 21, 2020, pp. 1-2.

* cited by examiner

POUCH MOLDING METHOD AND APPARATUS

CROSS-REFERENCE TO RELATED APPLICATION

This application is a U.S. national phase application, pursuant to 35 U.S.C. §371, of PCT/KR2018/014134, filed Nov. 16, 2018, designating the United States, which claims priority to Korean Application No. 10-2017-0160098, filed Nov. 28, 2017. The entire contents of the aforementioned patent applications are incorporated herein by this reference.

TECHNICAL FIELD

The present invention relates to a pouch molding method and apparatus, and more particularly, to a pouch molding method and apparatus, in which, when a cup part of a pouch is formed, elongation of a pouch film is uniformly maintained to prevent wrinkles from occurring in the cup part.

BACKGROUND ART

Due to the environment surrounded by various electronic devices, batteries (cells) that generate electric energy through physical or chemical reactions to supply the generated electric energy to the outside are used when AC power to be supplied to the building is not available, or when DC power is required.

Among such batteries, primary batteries and secondary batteries, which are chemical cells using chemical reactions, are generally used. The primary batteries are consumable cells which are collectively referred to as dry cells. On the other hand, a secondary battery is a rechargeable battery that is manufactured using a material in which oxidation and reduction processes between current and a material are capable of being repeated multiple times. In other words, when the reduction reaction to the material is performed by the current, power is charged. When the oxidation reaction to the material is performed by the current, power is discharged. Such charging-discharging are repeatedly performed to generate electricity.

In general, secondary batteries comprise nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

A lithium secondary battery is generally formed by laminating a positive electrode (i.e., cathode), a separator, and a negative electrode (i.e., anode). Materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to a graphite electrode of the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. The electrode assembly is accommodated in a specific case.

Such a secondary battery is classified into a pouch type secondary battery and a can type secondary battery based on a material of a case that accommodates the electrode assembly. In the pouch type secondary battery, an electrode assembly is accommodated in a pouch made of a flexible polymer material having a variable shape. In the can type secondary battery, an electrode assembly is accommodated in a case made of a metal or plastic material having a predetermined shape.

A pouch that is a case of the pouch type secondary battery is manufactured by forming a cup part on a pouch film made of a flexible material. When the cup part having an accommodation space for accommodating the electrode assembly is formed in the pouch film, the electrode assembly is accommodated in the accommodation space of the cup part, and a sealing part is sealed to manufacture a secondary battery. According to the related art, drawing molding is performed on the pouch film to form the cup part, thereby manufacturing the pouch. The drawing molding is performed by inserting the pouch film into a press and elongating the pouch film using a punch. However, in the drawing molding process, a force for elongating the pouch film is not uniform, causes wrinkles on the cup part, and deteriorates an cosmetic appearance, thereby deteriorating quality of a product. In addition, since a thickness of the pouch is not uniform due to the occurrence of the wrinkles, a thin and weak portion may occur to shorten a lifetime of the pouch.

Further, the cup part is formed by inserting the pouch film into an open part formed in a center of a die. For this, the punch applies a pressure of the pouch film to elongate the pouch film. However, in order to adjust a depth of the cup part, the pouch molding apparatus is disassembled to allow a user to directly changes a position of a Blank holder formed inside the open part.

DISCLOSURE OF THE INVENTION

Technical Problem

An object to be solved by the present invention is to provide a pouch molding method and apparatus, in which, when a cup part of a pouch is formed, elongation force that is exerted on a pouch film is uniformly dispersed to prevent wrinkles from occurring on the cup part and also prevent a cosmetic appearance from being deteriorated.

In addition, the present invention provides a pouch molding method and apparatus, in which a pouch has a uniform thickness to prevent a weak portion from occurring in a cup part and to extend a lifetime of the pouch.

The objects of the present invention are not limited to the aforementioned object, but other objects not described herein will be clearly understood by those skilled in the art from descriptions below.

Technical Solution

To solve the above problems, a pouch molding method according to an embodiment of the present invention includes: a seating step of seating a pouch film on a top surface of a die; a stripper descending step of allowing a stripper disposed above the die to descend; a fixing step of fixing the pouch film using the stripper; a molding preparation step of allowing a Blank holder disposed at a central portion of the die to ascend to contact one surface of the pouch film and allowing a punch disposed at a central portion of the stripper to descend to contact the other surface of the pouch film; and a molding step of allowing the punch and the Blank holder to descend along with each other to form a cup part in the pouch film.

The molding preparation step may be performed in an order of: a step of allowing the Blank holder to ascend; a step of allowing the Blank holder to contact the one surface of the pouch film; a step of allowing the punch to descend; and a step of allowing the punch to contact the other surface of the pouch film.

The molding preparation step may be performed in an order of: a step of allowing the punch to descend; a step of allowing the punch to contact the other surface of the pouch film; a step of allowing the blocking to ascend; and a step of allowing the Blank holder to contact the one surface of the pouch film.

After the molding preparation step, the punch and the Blank holder may contact each other with the pouch film therebetween.

Further, a power may be provided to the Blank holder by a cylinder to allow the Blank holder to move vertically.

The cylinder may be operated by a hydraulic pressure.

To solve the above problems, a pouch molding apparatus according to an embodiment of the present invention includes: a die on which a pouch film is seated on a top surface thereof; a stripper disposed above the die and configured to contact the die with the pouch film therebetween when descending to fix the pouch film; a Blank holder disposed at a central portion of the die to move vertically and configured to ascend to contact one surface of the pouch film; and a punch disposed at a central portion of the stripper to move vertically and configured to descend to contact the other surface of the pouch film, wherein the punch and the Blank holder contact each other with the pouch film therebetween to descend along with each other.

The pouch molding apparatus may further include a cylinder that provides a power to the Blank holder to allow the Blank holder to move vertically.

The cylinder may be operated by a hydraulic pressure.

To solve the above problems, a pouch molding method includes: a seating step of seating a pouch film on a top surface of a die; a stripper descending step of allowing a stripper disposed above the die to descend; a fixing step of fixing the pouch film using the stripper; a molding preparation step of allowing a Blank holder disposed at a central portion of the stripper to descend to contact one surface of the pouch film and allowing a punch disposed at a central portion of the die to ascend to contact the other surface of the pouch film; and a molding step of allowing the punch and the Blank holder to ascend along with each other to form a cup part in the pouch film.

The molding preparation step may be performed in an order of: a step of allowing the Blank holder to descend; a step of allowing the Blank holder to contact the one surface of the pouch film; a step of allowing the punch to ascend; and a step of allowing the punch to contact the other surface of the pouch film.

The molding preparation step may be performed in an order of: a step of allowing the punch to ascend; a step of allowing the punch to contact the other surface of the pouch film; a step of allowing the Blank holder to descend; and a step of allowing the Blank holder to contact the one surface of the pouch film.

After the molding preparation step, the punch and the Blank holder may contact each other with the pouch film therebetween.

Further, a power may be provided to the Blank holder by a cylinder to allow the Blank holder to move vertically.

The cylinder may be operated by a hydraulic pressure.

To solve the above problems, a pouch molding apparatus includes: a die on which a pouch film is seated on a top surface thereof; a stripper disposed above the die and configured to contact the die with the pouch film therebetween when descending to fix the pouch film; a Blank holder disposed at a central portion of the stripper to move vertically and configured to descend to contact one surface of the pouch film; and a punch disposed at a central portion of the die to move vertically and configured to ascend to contact the other surface of the pouch film, wherein the punch and the Blank holder contact each other with the pouch film therebetween to ascend along with each other.

The pouch molding apparatus may further include a cylinder that provides a power to the Blank holder to allow the Blank holder to move vertically.

The cylinder may be operated by a hydraulic pressure.

Particularities of other embodiments are included in the detailed description and drawings.

Advantageous Effects

The embodiments of the present invention may have at least the following effects.

Since the pouch film is elongated while the Blank holder moves together with the punch, when the cup part of the pouch is formed, the elongation force that is exerted on the pouch film may be uniformly dispersed to prevent the wrinkles from occurring in the cup part, thereby improving the commercial value.

In addition, the pouch may have the uniform thickness to prevent a weak portion from occurring in the cup part and to extend the lifetime of the pouch.

In addition, since the length by which the Blank holder moves is adjustable, the formed cup part may be easily adjusted in depth.

The effects of the prevent invention are not limited by the aforementioned description, and thus, more varied effects are involved in this specification.

MODE FOR CARRYING OUT THE INVENTION

Figure 1:
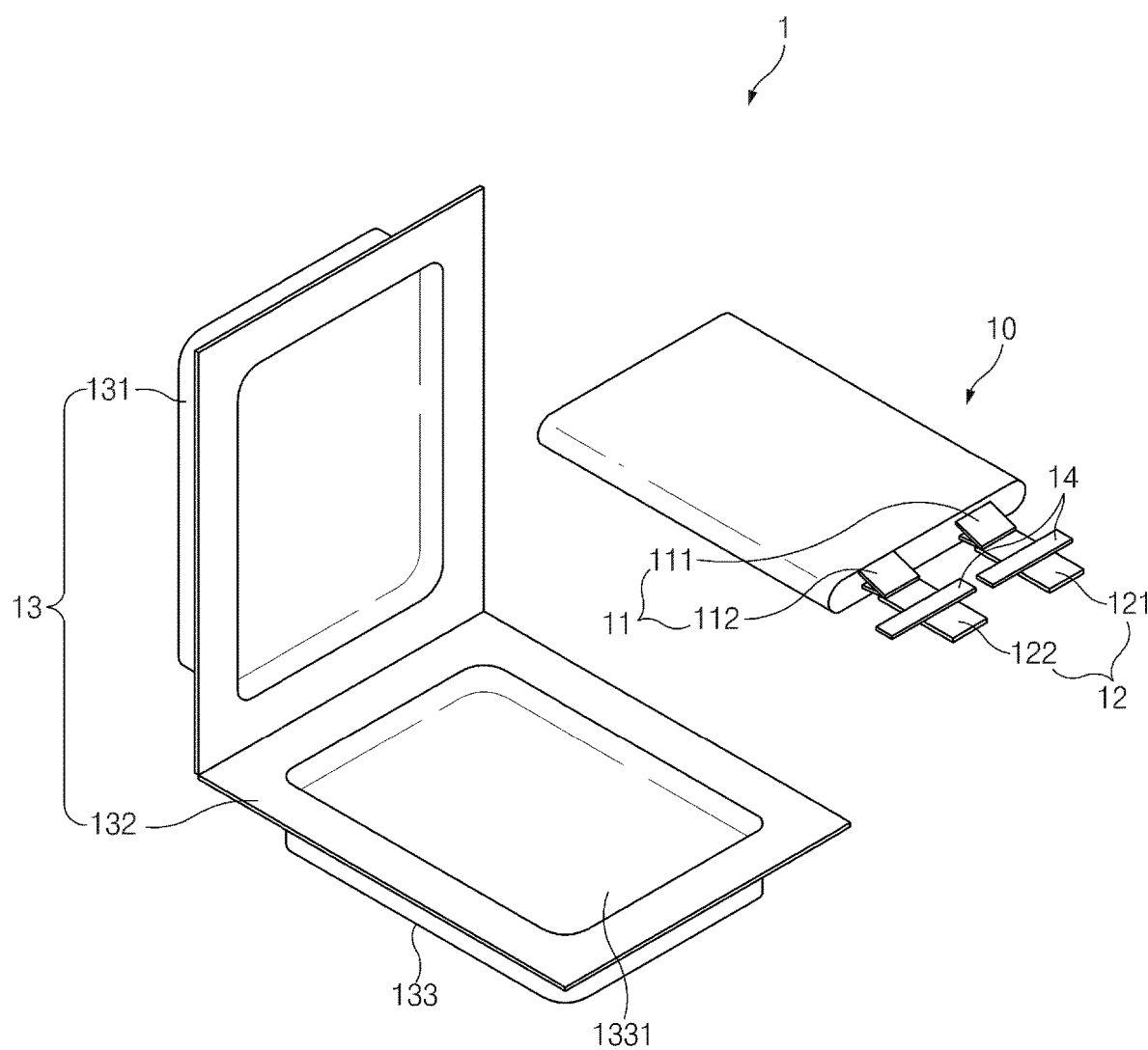
FIG. 1 is an assembly view of a typical pouch type secondary battery.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

FIG. 1 is an assembly view of a typical pouch type secondary battery 1.

As illustrated in FIG. 1, the typical pouch type secondary battery 1 includes a pouch type battery case 13 and an electrode assembly 10 accommodated in the battery case 13.

The electrode assembly 10 may have a laminated structure including two electrode plates such as a positive electrode plate and a negative electrode plate, and a separator disposed between the electrode plates to insulate the electrode plates from each other or disposed on at a left or right side of one electrode plate. The laminated structure may have various shapes without being limited to a particular shape, for example, the positive electrode plates and the negative electrode plate, each of which has a predetermined standard, may be laminated with the separator therebetween or be wound in the form of a jelly roll. Each of the two electrode plates has a structure in which active material slurry is applied to a metal foil or a mesh-shaped current collector including aluminum and copper. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons move, between the inside and outside of the electrode assembly 10.

A current collector of the electrode assembly 10 is constituted by a portion coated with an electrode active material and a distal end, on which the electrode active material is not applied, i.e., a non-coating portion. Further, the electrode tab 111 may be formed by cutting the non-coating portion or by connecting a separate conductive member to the non-coating portion by ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 by spot welding. Further, a portion of the electrode lead 12 is surrounded by an insulation part 14. The insulation part 14 may be disposed to be limited within a sealing part, at which an upper pouch 131 and a lower pouch 132 are thermally fused, to be bonded to the battery case 13. Further, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively small thickness is generally used as the insulation part 14, the present invention is not limited thereto. For example, various members may be used as the insulation part 14 as long as the members are capable of insulating the electrode lead 12.

The electrode lead 12 may extend in the same direction or extend in directions different from each other based on the formation positions of the positive electrode tab 111 and the negative electrode tab 112. The positive electrode lead 121 and the negative electrode lead 122 may be made of materials different from each other. In other words, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). A portion of the electrode lead 12, which protrudes to the outside of the battery case 13, may be provided as a terminal part and electrically connected to an external terminal.

The battery case 13 is a pouch made of a flexible material. The battery case 13 accommodates the electrode assembly 10 to allow a portion of the electrode lead 12, i.e., the terminal part to be exposed and then to be sealed. As illustrated in FIG. 1, the battery case 13 includes the upper pouch 131 and the lower pouch 132. An accommodation space 1331 in which a cup part 133 is formed to accommodate the electrode assembly 10 may be provided in the lower pouch 132, and upper pouch 131 may cover an upper side of the accommodation space 1331 to prevent the electrode assembly 10 from being separated to the outside of the battery case 13. Although the cup part 133 is formed in only the lower pouch 132 in FIG. 1, the present invention is not limited thereto. The cup part 133 may be variously formed, for example, formed in the upper pouch 131. As illustrated in FIG. 1, one side of the upper pouch 131 and one side of the lower pouch 132 may be connected to each other.

However, the present invention is not limited thereto. For example, the upper pouch 131 and the lower pouch 132 may be separately manufactured to be separated from each other.

When the electrode lead 12 is connected to the electrode tab 11 of the electrode assembly 10, and the insulation part 14 is provided on a portion of the electrode lead 12, the electrode assembly 10 may be accommodated in the accommodation space provided in the cup part 133 of the lower pouch 132, and the upper pouch 131 may cover an upper portion of the accommodation space. Further, the electrolyte is injected, and the sealing part provided on an edge of each of the upper pouch 131 and the lower pouch 132 is sealed. The electrolyte may transfer lithium ions generated by electrochemical reactions of the electrode plates during charging and discharging of the secondary battery 1. The electrolyte may include a non-aqueous organic electrolyte that is a mixture of a lithium salt and a high-purity organic solvent or a polymer using a polymer electrolyte. The pouch type secondary battery 1 may be manufactured by the above-described method.

Figure 2:
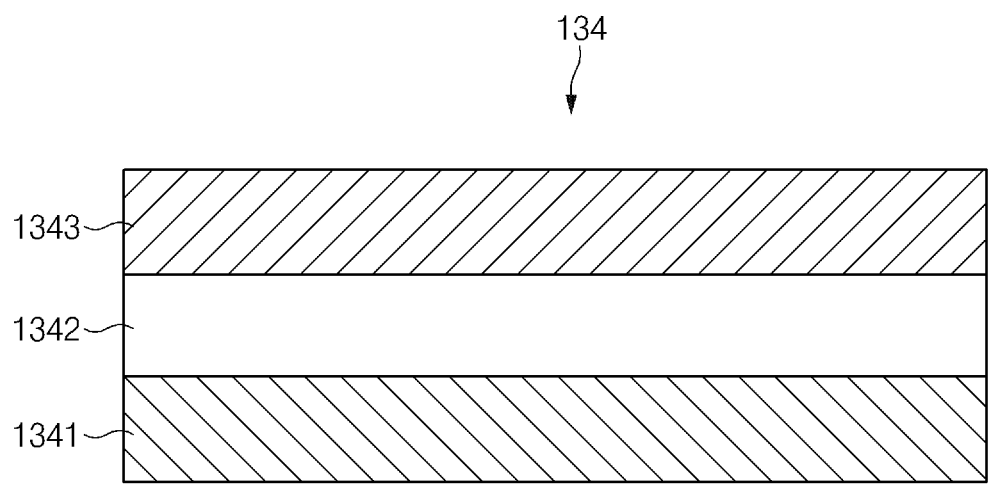
FIG. 2 is a cross-sectional view of a typical pouch film.

FIG. 2 is a cross-sectional view of a typical pouch film 134.

A typical battery case 13 is manufactured by performing drawing molding on the pouch film 134. In other words, the pouch film 134 is elongated to form the cup part 133, thereby manufacturing the battery case 13. The pouch film 134 includes a gas barrier layer 1342, a surface protection layer 1343, and a sealant layer 1341. The gas barrier layer 1342 blocks introduction and discharge of a gas and includes a metal. Thus, aluminum (Al) foil is generally used as the gas barrier layer. A surface protection layer 1343 is disposed on the outermost layer and thus frequently experience friction and collision with the outside. Thus, a polymer such as a nylon resin, PET, or the like having abrasion resistance and heat resistance is generally used for the surface protection layer 1343. The sealant layer 1341 is disposed on the innermost layer and directly contacts the electrode assembly 10. Thus, a polymer such as polypropylene (PP) or the like is generally used for the sealant layer 1341.

The pouch type battery case 13 may be manufactured by processing a film having the above-described lamination structure into the form of a bag. Thus, when the electrode assembly 10 is accommodated in the pouch type battery case 13, the electrolyte is injected. Thereafter, when the upper pouch 131 and the lower pouch 132 contact each other, and thermal compression is applied to the sealing part, the sealant layers 1341 may be bonded to each other to seal the battery case 13. Since the sealant layer 1341 directly contacts the electrode assembly 10, the sealant layer 1341 may be required to have insulating properties. Further, since the sealant layer 1341 contacts the electrolyte, the sealant layer 1341 may be required to have corrosion resistance. Since the inside of the battery case 13 is completely sealed to prevent materials from moving between the inside and outside of the battery case 13, high sealability is required. Accordingly, the sealing part on which the sealant layers 1341 are bonded to each other is required to have a superior thermal bonding strength. In general, a polyolefin-based resin such as polypropylene (PP) or polyethylene (PE) may be used for the sealant layer 1341. Particularly, polypropylene (PP) is excellent in mechanical properties such as tensile strength, rigidity, surface hardness, abrasion resistance, and heat resistance, and chemical properties such as corrosion resistance, and thus is generally used for manufacturing the sealant layer 1341.

Figure 3:
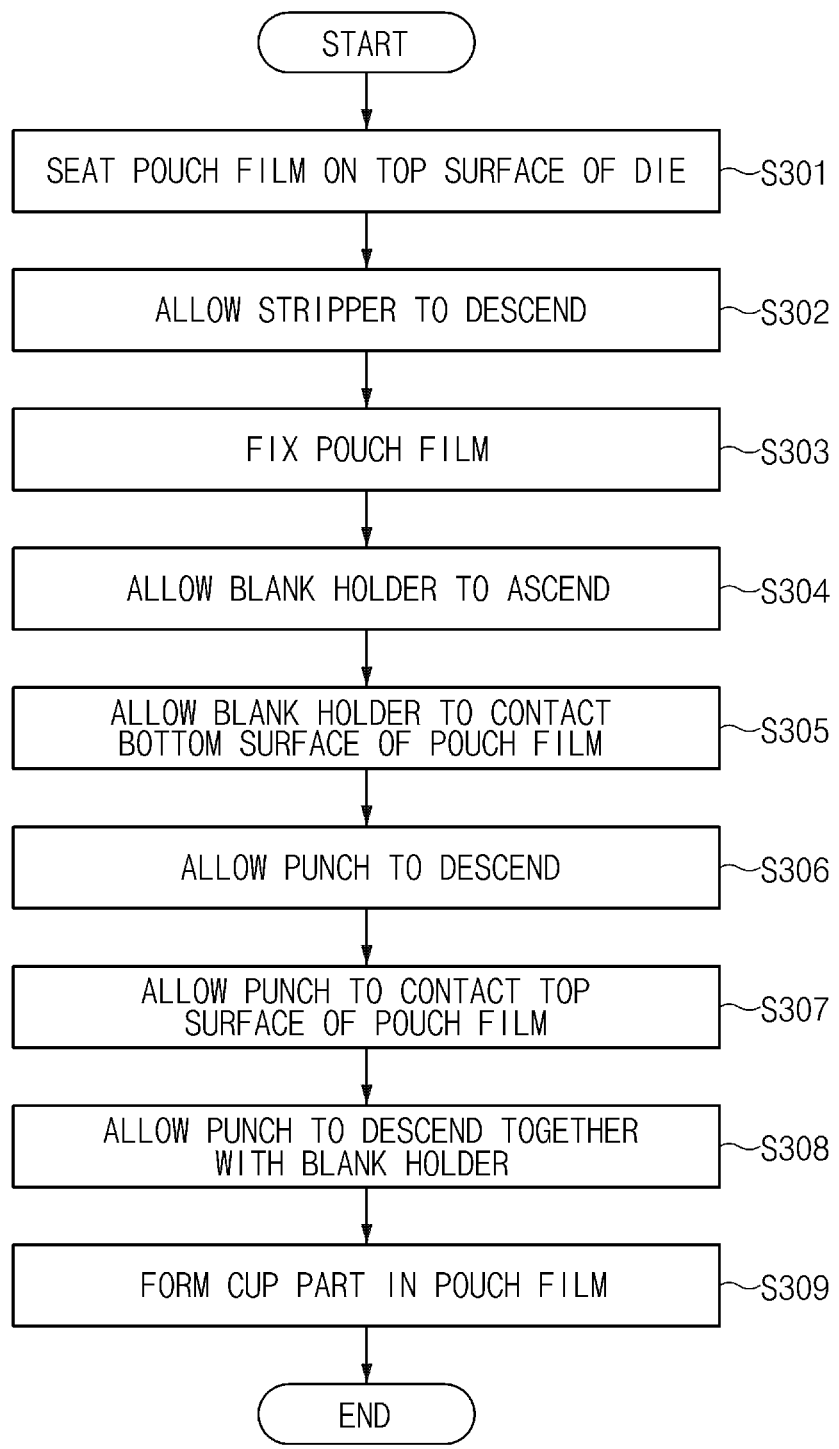
FIG. 3 is a flowchart illustrating a process of forming a cup part in a pouch film using a pouch molding apparatus according to an embodiment of the present invention.

FIG. 3 is a flowchart illustrating a process of forming the cup part in the pouch film 134 using a pouch molding apparatus 2 according to an embodiment of the present invention.

The battery case 13 according to an embodiment of the present invention may be preferably a pouch made of a flexible material. Hereinafter, the case in which the battery case 13 is the pouch will be described.

As described above, the cup part 133 is formed in the battery case 13. In the pouch molding apparatus 2 according to an embodiment of the present invention, not only a punch 24 moves in a vertical direction, but also a Blank holder 23 moves along with the punch 24 to form the cup part 133. Thus, residual stress in the battery case 13 may be minimized, and also, the formed cup part 133 may be easily adjusted in depth.

Hereinafter, contents of each step of the flowchart illustrated in FIG. 3 will be described with reference to FIGS. 4 to 9.

Figure 4:
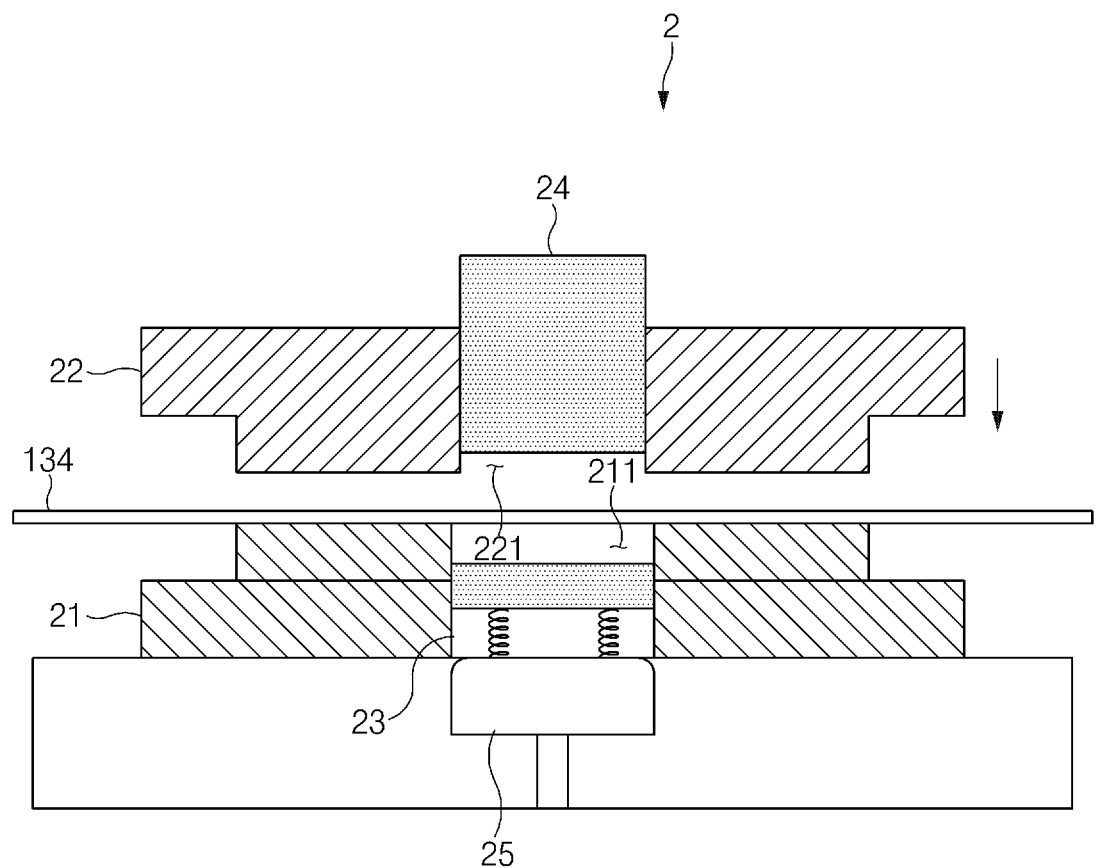
FIG. 4 is a schematic view of the pouch molding apparatus according to an embodiment of the present invention.

FIG. 4 is a schematic view of the pouch molding apparatus 2 according to an embodiment of the present invention.

As illustrated in FIG. 4, the pouch molding apparatus 2 according to an embodiment of the present invention includes a die 21 on which the pouch film 134 is seated, a stripper 22 that fixes the pouch film 134, a Blank holder 23 that supports the cup part 133 when the cup part 133 is formed in the pouch film 134, and a punch 24 that elongates the pouch film 134.

The pouch film 134 is seated on a top surface of the die 21. The die 21 may have a substantially flat top surface to allow the pouch film 134 to be easily seated. However, the present invention is not limited thereto. For example, in order to more easily fix the pouch film 134 later, various shapes such as a lattice pattern or a fine unevenness may be formed on the top surface of the die 21. In order to form the cup part 133 in the pouch film 134, as illustrated in FIG. 4, the pouch film 134 is first seated on the top surface of the die 21 (S301).

An open part 211 is formed in an approximate center of the top surface of the die 21. The open part 211 may have a shape and a size that correspond to a shape and a size of an outer surface of the cup part 133, which will be formed later. The correspondence of the shape and the size may mean that they are the same or that a difference is within a range of offset even if some difference exists. Thus, if the cup part 133 has a rectangular shape, the open part 211 may also have a rectangular shape. If the cup part 133 has a circular shape, the open part 211 may also have a circular shape. When the pouch film 134 is seated on the top surface of the die 21, the pouch film 134 is seated to allow the open part 211 to be disposed in a region in which the cup part 133 will be formed later.

The stripper 22 is disposed above the die 21 to descend when the pouch film 134 is seated on the top surface of the die 21. The stripper 22 contacts the die 21 with the pouch film 134 therebetween and presses the pouch film 134 from the upper side to fix the pouch film 134. The contact of the stripper 22 and the die 21 with the pouch film 134 therebetween means that the components do not directly contact each other but indirectly contact each other through the pouch film 134. When the cup part 133 is formed later, the stripper 22 uniformly presses the pouch film 134 to uniformly disperse the elongation force applied to the pouch film 134. As a result, a bottom surface of the stripper 22 contacts the top surface of the pouch film 134 when the pouch film 134 is fixed. Thus, the stripper 22 may have a substantially flat bottom surface. However, the present invention is not limited thereto. For example, in order to more easily fix the pouch film 134, various shapes such as a lattice pattern or a fine unevenness may be formed on the bottom surface of the stripper 22.

The punch 24 descends at a predetermined pressure and at a predetermined speed to apply a pressure to the top surface of the pouch film 134 seated on the die 21, thereby elongating the pouch film 134. Thus, the cup part 133 may be formed in the pouch film 134 to manufacture the pouch. A through-part 221 is formed at an approximate center of the bottom surface of the stripper 22. The punch 24 passes through the stripper 22 through the through-part 221 to move vertically. When the punch 24 moves vertically, the through-part 221 has a shape and a size that correspond to a shape and a size of the punch 24 to allow an inner wall of the through-part 221 to guide the punch 24. The correspondence of the shape and the size may mean that they are the same or that a difference is within a range of offset even if some difference exists. Thus, the punch 24 is slightly smaller than the through-part 221 of the stripper 22 by a degree of an offset to easily pass through the through-part 221 of the stripper 22.

Further, the punch 24 has a shape and a size that correspond to a shape and a size of an inner surface of the cup part 133, which will be formed later. The correspondence of the shape and the size may mean that they are the same or that a difference is within a range of offset even if some difference exists. Thus, if the cup part 133 has a rectangular shape, the punch 24 may also have a rectangular shape. If the cup part 133 has a circular shape, the punch 24 may also have a circular shape. Thus, when the cup part 133 is formed in the pouch film 134 later, the punch 24 is inserted into the open part 211 of the die along with the pouch film 134 to elongate the pouch film 134. Thus, the punch 24 is slightly smaller than the open part 211 of the die 21 by a thickness of the pouch film 134.

The Blank holder 23 is disposed inside the open part 211 formed in the approximately central portion of the die 21 to prevent the wrinkles from occurring on a corner of the cup part when the cup part is completely molded. According to an embodiment of the present invention, when the pouch film 134 is seated on the die 21, the Blank holder 23 ascends to allow a top surface thereof to contact the bottom surface of the pouch film 134. Thus, when the punch 24 descends to allow the bottom surface of the punch 24 to contact the top surface of the pouch film 134, the Blank holder 23 and the punch 24 contact each other with the pouch film 134 therebetween. When the punch 24 further descends to elongate the pouch film 134, the Blank holder 23 supports the cup part 133 formed in the pouch film 134 to descend along with the punch 24. Thus, the elongation force of the pouch film 134 may be uniformly dispersed to prevent the wrinkles from occurring in the cup part 133. Further, the pouch may have the uniform thickness to prevent a weak portion from occurring in the cup part 133 and to extend the lifetime of the pouch. In addition, since the length by which the Blank holder 23 moves is adjustable, the formed cup part 133 may be easily adjusted in depth.

The Blank holder 23 vertically moves within the open part 211 of the die 21. When the Blank holder 23 moves vertically, the Blank holder 23 has a shape and a size that correspond to a shape and a size of the open part 211 to allow the inner wall of the open part 211 to guide the Blank holder 23. The correspondence of the shape and the size may mean that they are the same or that a difference is within a range of offset even if some difference exists. Thus, the Blank holder 23 is slightly smaller than the open part 211 of the die 21 by a degree of the offset to allow the Blank holder 23 to easily move vertically within the open part 211.

It is preferable that the open part 211 of the above-described die 21, the through-part 221 of the stripper 22, the punch 24, and the Blank holder 23 share a same central axis. Thus, the punch 24 and the Blank holder 24 may smoothly move in the vertical direction.

The pouch molding apparatus 2 according to an embodiment of the present invention may further include a cylinder 25. Thus, as illustrated in FIG. 4, when the cylinder 25 moves vertically to transmit a force to the Blank holder 23, the Blank holder 23 may receive the force from the cylinder 25 to move vertically. The cylinder 25 may be provided as a hydraulic system which operates by a pressure generated when a gas or a fluid such as liquid flows in the cylinder 25. However, the present invention is not limited thereto. Although not shown, a cylinder 25 may also be connected to the punch 24 to allow the punch to move vertically.

Figure 5:
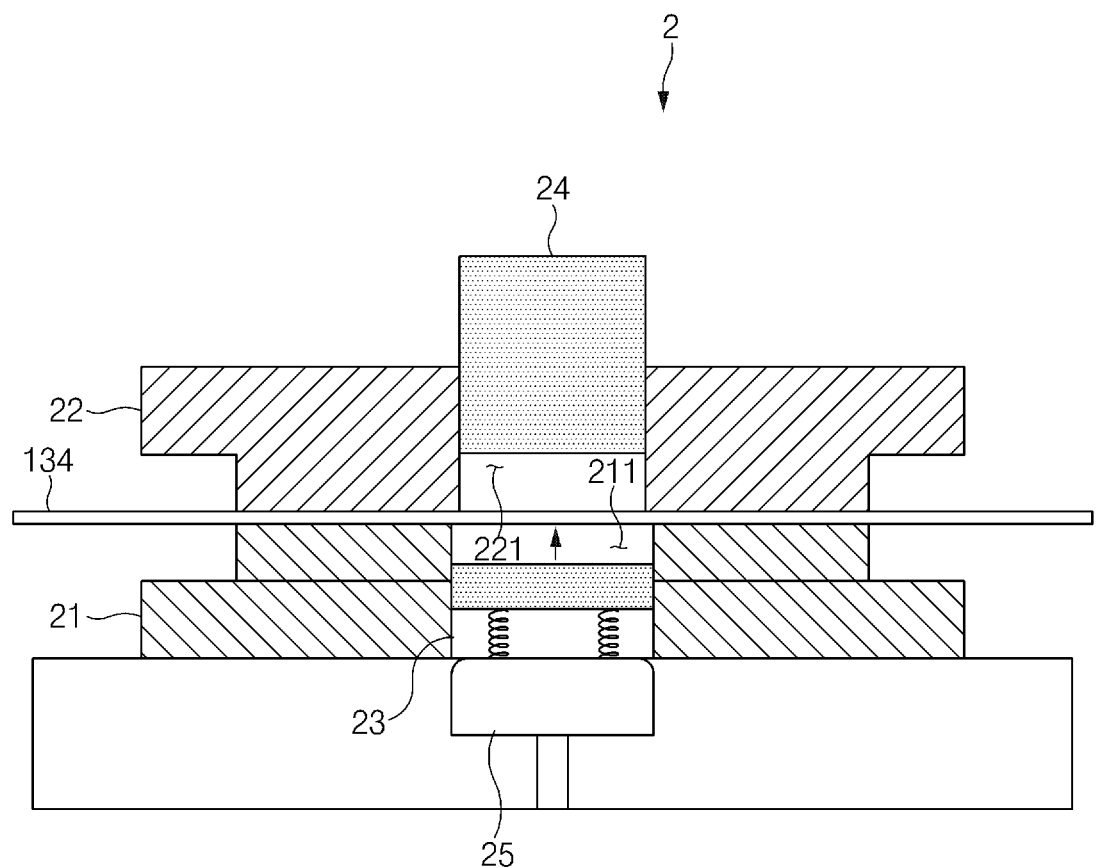
FIG. 5 is a schematic view illustrating a state in which a stripper descends according to an embodiment of the present invention.

FIG. 5 is a schematic view illustrating a state in which the stripper descends according to an embodiment of the present invention.

When the pouch film 134 is seated on the top surface of the die 21, as illustrated in FIG. 5, the stripper 22 descends (S302). When the top surface of the pouch film 134 contacts the bottom surface of the stripper 22, the stripper 22 and the die 21 contact each other with the pouch film 134 therebetween. The stripper 22 presses the pouch film 134 from the upper side to fix the pouch film 134 (S303). In particular, the stripper 22 uniformly presses the pouch film 134 to uniformly disperse the elongation force applied to the pouch film 134 when the cup part 133 is formed later.

Figure 6:
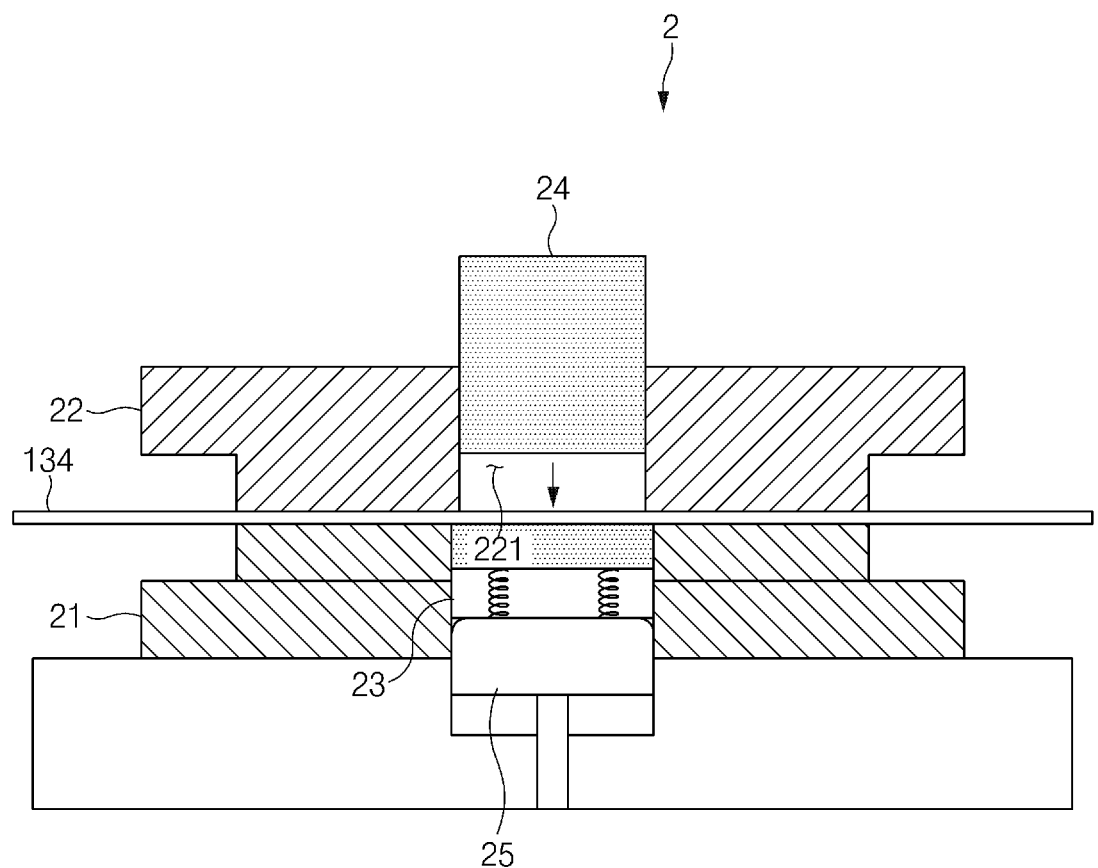
FIG. 6 is a schematic view illustrating a state in which a Blank holder ascends according to an embodiment of the present invention.

FIG. 6 is a schematic view illustrating a state in which the Blank holder 23 ascends according to an embodiment of the present invention.

When the stripper 22 fixes the pouch film 134, the Blank holder 23 ascends as illustrated in FIG. 6 (S304). The top surface of the Blank holder 23 contacts the bottom surface of the pouch film 134 (S305). In particular, in order to prevent the pouch film 134 from being elongated in an opposite direction, the Blank holder 23 ascends until the top surface of the Blank holder 23 contacts the bottom surface of the pouch film 134. Subsequently, when contacting the pouch film 134, the ascending of the Blank holder 23 is stopped. Thus, even though the Blank holder 23 contacts the pouch film 134, no pressure is applied, and thus, the pouch film 134 is not elongated.

Figure 7:
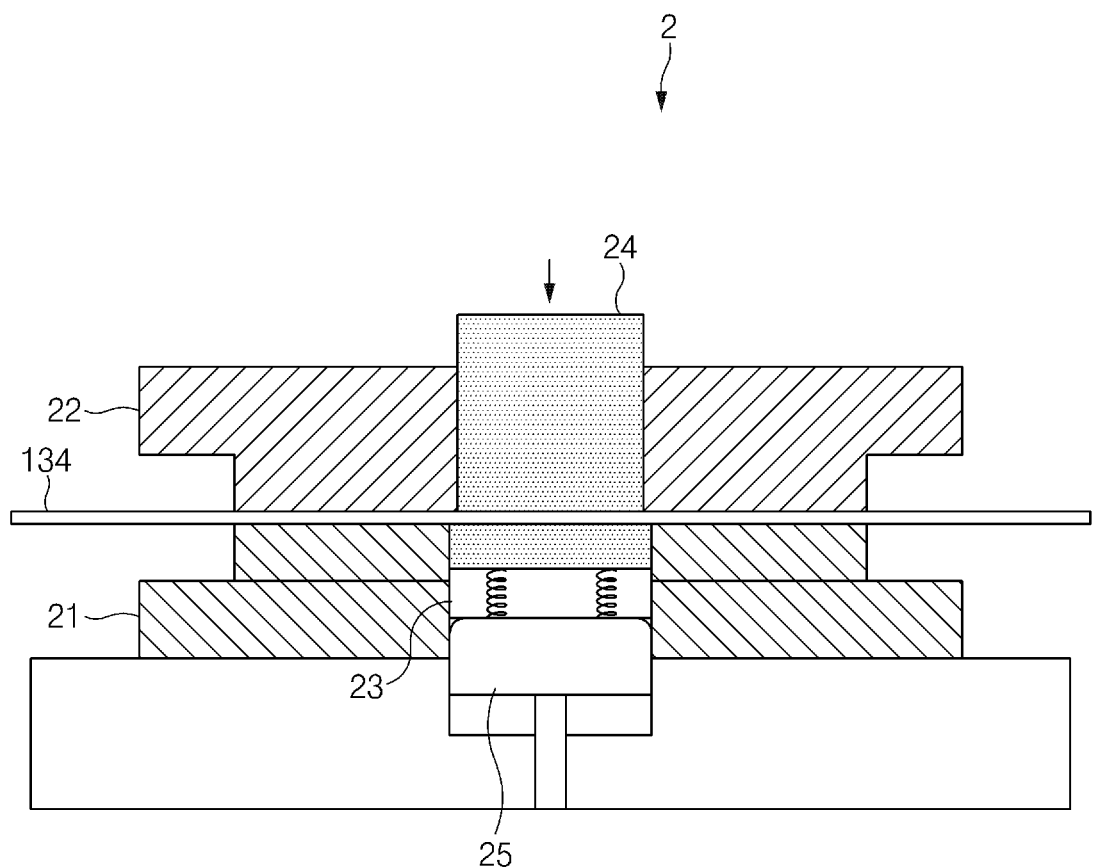
FIG. 7 is a schematic view illustrating a state in which a punch descends according to an embodiment of the present invention.

FIG. 7 is a schematic view illustrating a state in which the punch 24 descends according to an embodiment of the present invention.

When the Blank holder 23 contacts the bottom surface of the pouch film 134, the punch 24 descends as illustrated in FIG. 7 (S306). The bottom surface of the punch 24 contacts the top surface of the pouch film 134 (S307). Since the Blank holder 23 and the punch 24 share the same central axis, the Blank holder 23 and the punch 24 are disposed at positions that correspond to each other. Since the Blank holder 23 already contacts the bottom surface of the pouch film 134, when the bottom surface of the punch 24 contacts the top surface of the pouch film 134, the Blank holder 23 and the punch 24 contact each other with the pouch film 134 therebetween.

Figure 8:
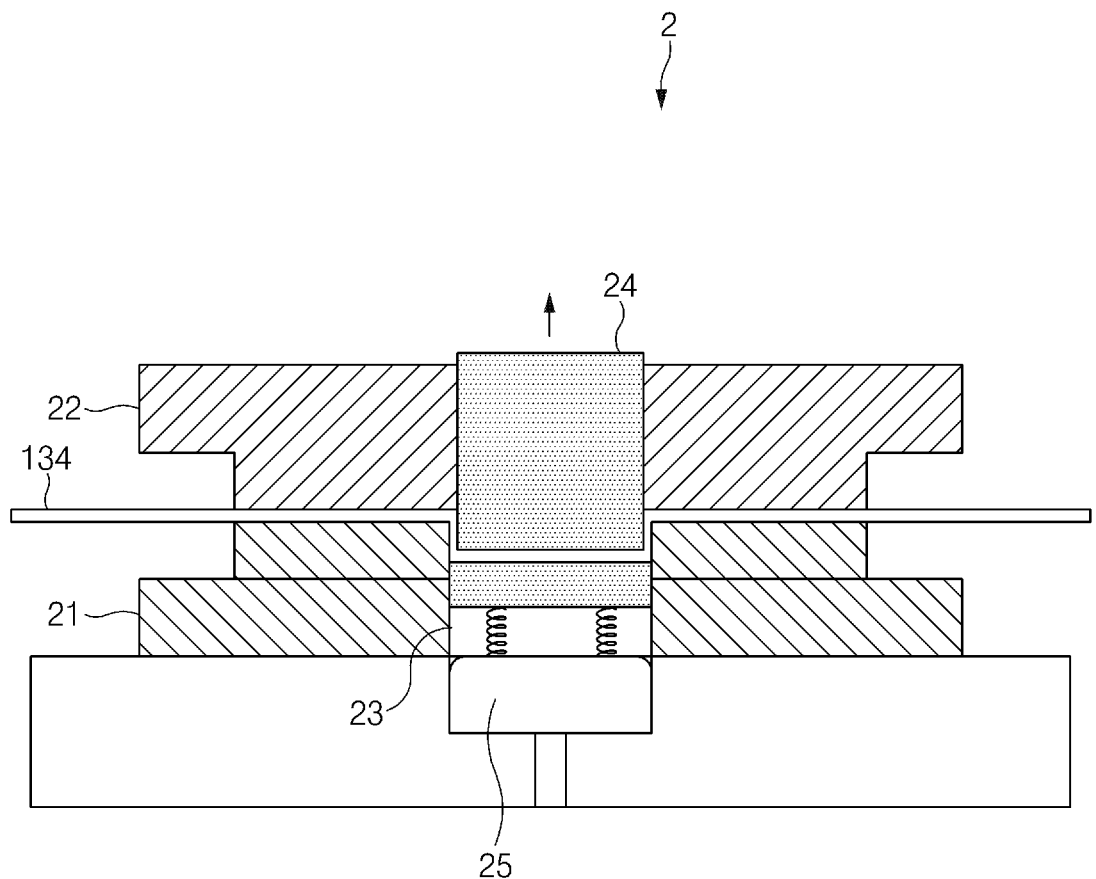
FIG. 8 is a schematic view illustrating a state in which the Blank holder and the punch descend according to an embodiment of the present invention.

FIG. 8 is a schematic view illustrating a state in which the Blank holder 23 and the punch 24 descend according to an embodiment of the present invention.

When the bottom surface of the punch 24 contacts the top surface of the pouch film 134, the punch 24 and the Blank holder 23 descend along with each other as illustrated in FIG. 8 to elongate the pouch film 134 (S308). Thus, the cup part 133 may be formed downward in the pouch film 134 (S309). In particular, the Blank holder 23 supports the cup part 133 formed in the pouch film 134 to descend along with the punch 24. Thus, the elongation force of the pouch film 134 may be uniformly dispersed to prevent the wrinkles from occurring in the cup part 133. Further, the pouch may have the uniform thickness to prevent a weak portion from occurring in the cup part 133 and to extend the lifetime of the pouch. In addition, since the vertical stroke of the Blank holder 23 is adjustable, the formed cup part 133 may be easily adjusted in depth.

Figure 9:
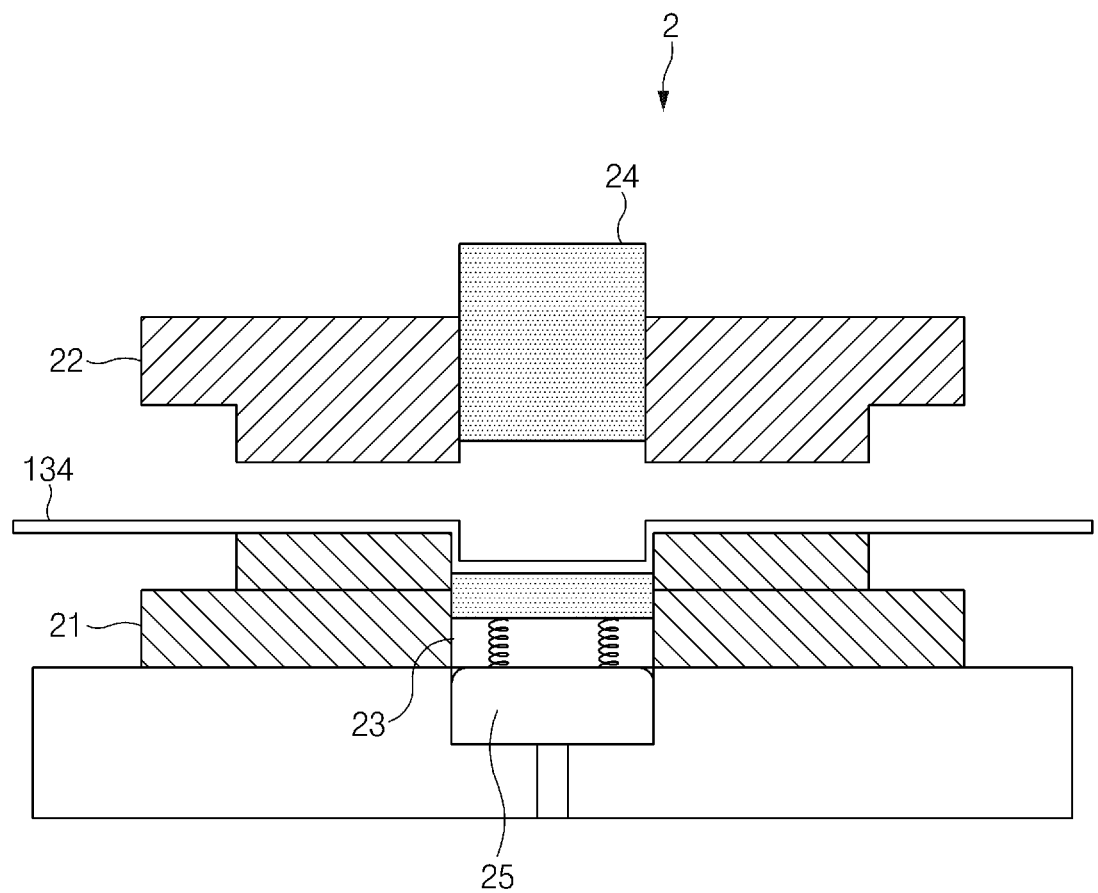
FIG. 9 is a schematic view illustrating a state in which the punch and the stripper ascend according to an embodiment of the present invention.

FIG. 9 is a schematic view illustrating a state in which the punch 24 and the stripper 22 ascend according to an embodiment of the present invention.

When the cup part 133 is formed in the pouch film 134 by the above-described processes, the punch 24 and the stripper 22 ascends again as illustrated in FIG. 9. Further, the pouch film 134 in which the cup part 133 is formed may be taken out, and the pouch is manufactured.

Figure 10:
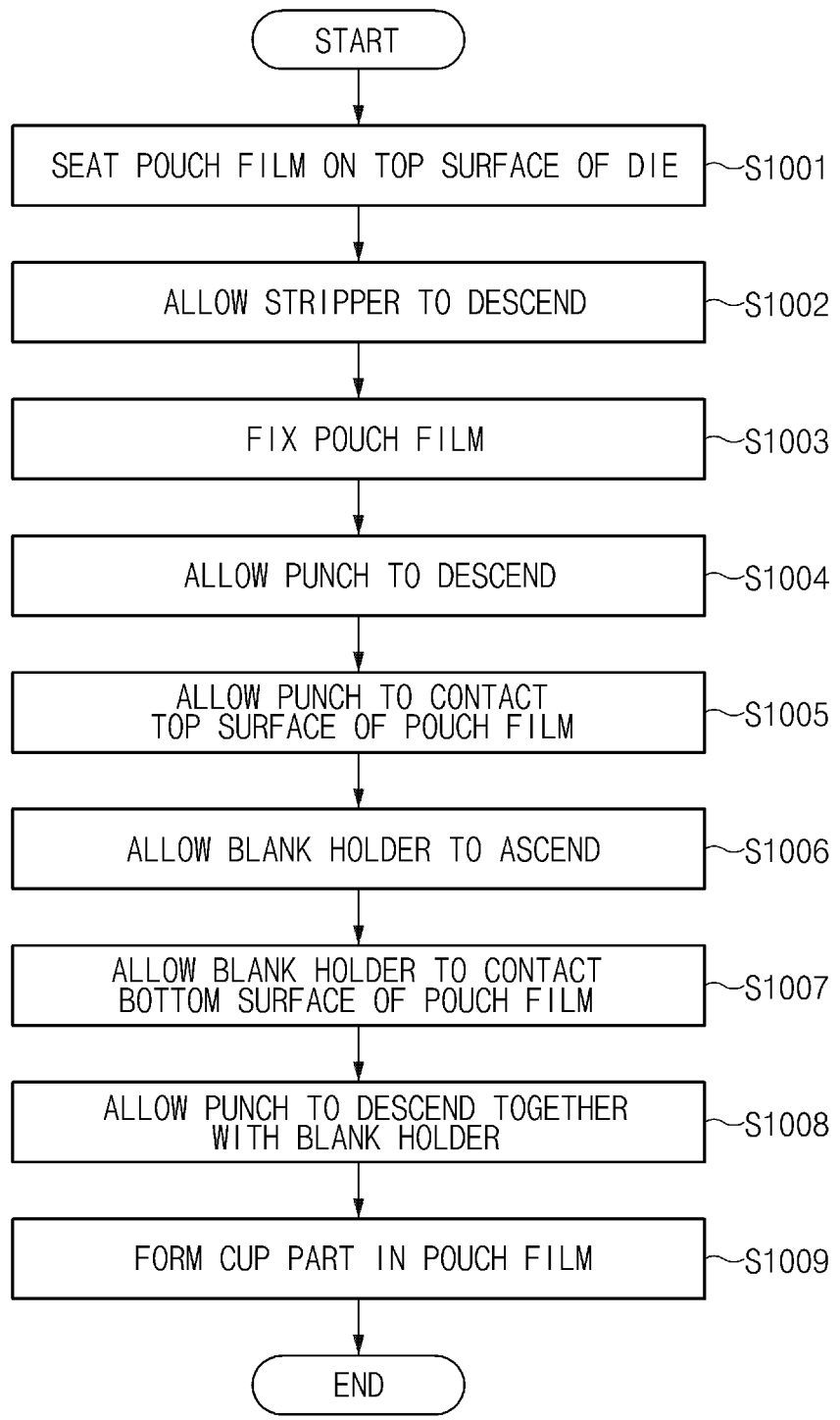
FIG. 10 is a flowchart illustrating a process of forming a cup part in a pouch using a pouch molding apparatus according to another embodiment of the present invention.

FIG. 10 is a flowchart illustrating a process of forming a cup part 133 in a pouch using a pouch molding apparatus 2 according to another embodiment of the present invention.

According to an embodiment of the present invention, the Blank holder 23 ascends first (S304) to allow the top surface of the Blank holder 23 to contact the bottom surface of the pouch film 134 (S305). Subsequently, the punch 24 descends (S306) to allow the bottom surface of the punch 24 to contact the top surface of the pouch film 134 (S307).

However, according to another embodiment of the present invention, as illustrated in FIG. 10, a punch 24 descends first (S1004) to allow a bottom surface of the punch 24 to contact a top surface of the pouch film 134 (S1005). Subsequently, a Blank holder 23 ascends (S1006) to allow a top surface of the Blank holder 23 to contact a bottom surface of the pouch film 134.

Hereinafter, a pouch molding method according to another embodiment of the present invention will be described. Here, duplicated contents with the pouch molding method according to the foregoing embodiments of the present invention will be omitted. However, the omission of the description is for convenience of description only and is not intended to limit the scope of the rights. The omitted contents may be easily derived by the person skilled in the art through this specification.

Hereinafter, contents of each step of the flowchart illustrated in FIG. 10 will be described with reference to FIG. 11.

Figure 11:
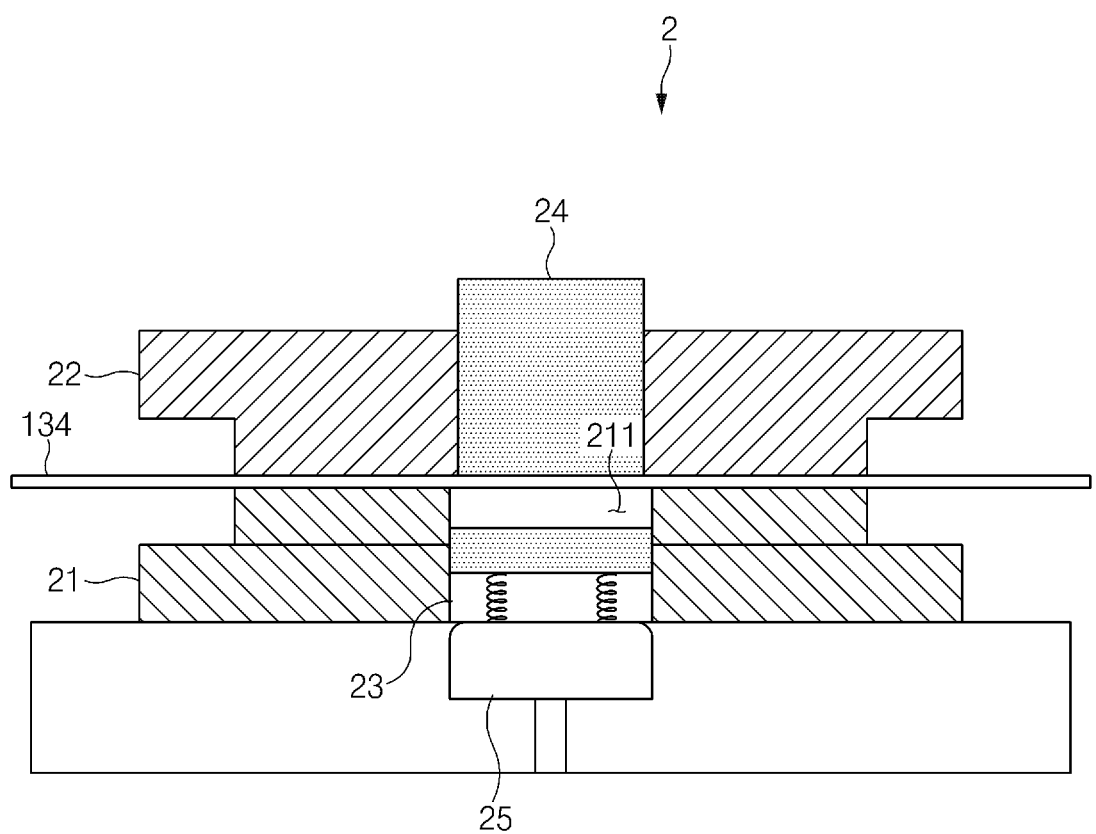
FIG. 11 is a schematic view illustrating a state in which a pouch descends according to another embodiment of the present invention.

FIG. 11 is a schematic view illustrating a state in which the pouch 24 descends according to another embodiment of the present invention.

In order to form the cup part 133 in the pouch film 134, as illustrated in FIG. 4, the pouch film 134 is seated on the top surface of the die 21 (S1001). Subsequently, as illustrated in FIG. 5, the stripper 22 descends (S1002). When the bottom surface of the stripper 22 contacts the top surface of the pouch film 134, the stripper 22 and the die 21 contact each other with the pouch film 134 therebetween. The stripper 22 presses the pouch film 134 from the upper side to fix the pouch film 134 (S1003).

As illustrated in FIG. 11, the punch 24 descends first (S1004), and the bottom surface of the punch 24 contacts the top surface of the pouch film 134 (S1005). In order to prevent the pouch film 134 from be prematurely elongated, the punch 24 descends until the bottom surface of the punch 24 contacts the top surface of the pouch film 134. When contacting the pouch film 134, the descending of the punch 24 is stopped. Thus, even though the punch 24 contacts the pouch film 134, no pressure is applied, and thus, the pouch film 134 is not elongated.

Thereafter, as illustrated in FIG. 7, the Blank holder 23 ascends (S1006), and the top surface of the Blank holder 23 contacts the bottom surface of the pouch film 134 (S1007). Further, as illustrated in FIG. 8, the punch 24 and the Blank holder 23 descend along with each other to elongate the pouch film 134 (S1008). Thus, the cup part 133 may be formed downward in the pouch film 134.

As described above, according to the pouch molding method according to another embodiment of the present invention, the orders of the steps S304 and S305 are switched with the steps S306 and S307. However, the present invention is not limited thereto. Although not shown, according to various embodiments of the present invention, the order of the steps S304 through S307 may be interchaged. However, according to any embodiment of the present invention, the step S305 is required to be performed after the step S304, and the step S307 is required to be performed after the step S306.

Particularly, the Blank holder 23 may ascend (S304), and subsequently, the punch 24 may descend (S306). Thereafter, the top surface of the Blank holder 23 may contact the bottom surface of the pouch film 134 (S305), and the bottom surface of the punch 24 may contact the top surface of the pouch film 134 (S307).

Alternatively, the Blank holder 23 may ascend (S304), and subsequently, the punch 24 may descend (S306). Thereafter, the bottom surface of the punch 24 may contact the top surface of the pouch film 134 (S307), and the top surface of the Blank holder 23 may contact the bottom surface of the pouch film 134 (S305).

Alternatively, the punch 24 may descend (S306), and subsequently, the Blank holder 23 may ascend (S304). Thereafter, the bottom surface of the punch 24 may contact the top surface of the pouch film 134 (S307), and the top surface of the Blank holder 23 may contact the bottom surface of the pouch film 134 (S305).

Alternatively, the punch 24 may descend (S306), and subsequently, the Blank holder 23 may ascend (S304). Thereafter, the top surface of the Blank holder 23 may contact the bottom surface of the pouch film 134 (S305), and the bottom surface of the punch 24 may contact the top surface of the pouch film 134 (S307).

Although not shown, the positions of the punch 24 and the Blank holder 23 may be switched.

For example, according to the pouch molding method according to an embodiment of the present invention, the Blank holder 23 is disposed in the through-part 221 of the stripper 22, and the punch 24 is disposed within the open part 211 of the die 21. When the stripper 22 presses the pouch film 134 seated on the top surface of the die 21 downward to fix the pouch film 134 (S303), the Blank holder passes through the through-part 221 of the stripper 22 to descend (S304), and the bottom surface of the Blank holder 23 contacts the top surface of the pouch film 134 (S305).

Thereafter, the punch 24 ascends from the open part 211 of the die 21 (S306), and the top surface of the punch 24 contacts the bottom surface of the pouch film 134 (S307). Further, the punch 24 and the Blank holder 23 ascend along with each other to elongate the pouch film 134 (S308). Thus, the cup part 133 may be formed upward in the pouch film 134 (S309).

As described above, if the Blank holder 23 moves along with the punch 24 to support the cup part 133, the embodiments of the present invention may vary without being limited to this specification.

Figure 12:
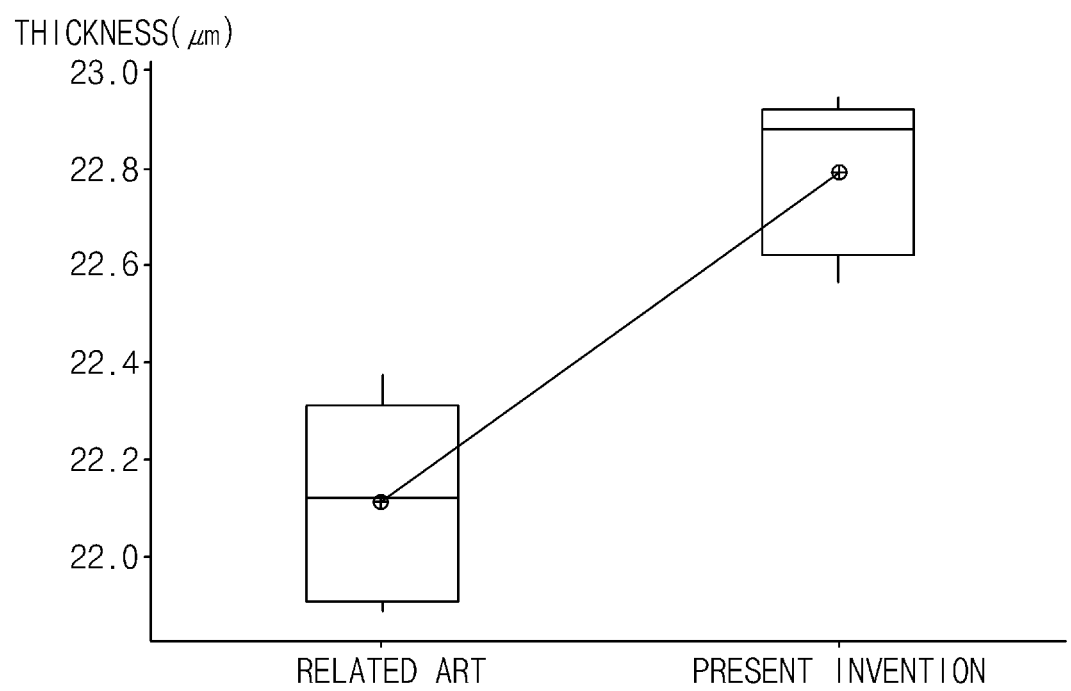
FIG. 12 is a plot comparing a pouch molded by the pouch molding method according to an embodiment of the present invention with a pouch molded by a pouch molding method according to the related art.

FIG. 12 is a plot comparing a pouch molded by the pouch molding method according to an embodiment of the present invention with the pouch molded by the pouch molding method according to the related art.

An experiment for molding a pouch using the pouch molding method according to an embodiment of the present invention was performed. A pouch film 134 used for the experiment has a width of 160 mm×160 mm and a thickness of 91 μm, and a punch has a pressure of 0.1 MPa. In general, when the pouch film 134 has a thickness of 91 μm, the gas barrier layer 1342 containing a metal has a thickness of about 35 μm. Five pouches were molded by the pouch molding method according to the related art, and a total of five pouches were molded by the pouch molding method according to an embodiment of the present invention. The thickness of the cup part formed in each of the five pouches was measured. Particularly, a corner portion connected to the bottom of the cup part from the sidewall of the cup part and a portion between the sidewalls, which are known as weak portions of the cup part, were measured.

As the result of the experiment, when the molding is performed with the method according to the related art, the gas barrier layer 1342 has a mean thickness of 22.112 μm. On the other hand, when the molding is performed with the method according to an embodiment of the present invention, the gas barrier layer 1342 has a mean thickness of 22.792 μm. Furthermore, in the pouch molded by the method according to an embodiment of the present invention, the smallest thickness exceeds 22.6 μm. On the other hand, in the pouch molded through the method according to the related art, the greatest thickness does not exceed 22.4 μm. Therefore, it is seen that the thickness of the molded pouches is more uniform with the method according to an embodiment of the present invention. Thus, in the actual experiment, it is seen that the elongation force exerting on the pouch film 134 is uniformly dispersed to prevent the wrinkles from occurring, and the pouch has the uniform thickness to extend the lifetime of the pouch.

Those with ordinary skill in the technical field of the present invention pertains will understand that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch molding method comprising:
   a seating step of seating a pouch film on a top surface of a die;
   a stripper descending step of allowing a stripper disposed above the die to descend;
   a fixing step of fixing the pouch film between the stripper and the die;
   a molding preparation step of ascending a Blank holder through an open part of the die until the Blank holder is flush with the top surface of the die and against one surface of the pouch film and descending a punch through a through-part of the stripper and against the other surface of the pouch film; and
   a molding step of allowing the punch and the Blank holder to descend together to form a cup part in the pouch film.

2. The pouch molding method of claim 1, wherein the molding preparation step is performed in an order of:
   a step of allowing the Blank holder to ascend;
   a step of allowing the Blank holder to contact the one surface of the pouch film;
   a step of allowing the punch to descend; and
   a step of allowing the punch to contact the other surface of the pouch film.

3. The pouch molding method of claim 1, wherein the molding preparation step is performed in an order of:
   a step of allowing the punch to descend;
   a step of allowing the punch to contact the other surface of the pouch film;
   a step of allowing the Blank holder to ascend; and
   a step of allowing the Blank holder to contact the one surface of the pouch film.

4. The pouch molding method of claim 1, wherein, after the molding preparation step, the punch and the Blank holder secure the pouch film therebetween.

5. The pouch molding method of claim 1, wherein a power is provided to the Blank holder by a cylinder to allow the Blank holder to move vertically.

6. The pouch molding method of claim 5, wherein the cylinder is operated by a hydraulic pressure.

7. A pouch molding apparatus comprising:
   a die having a top surface upon which a pouch film is configured to be seated, the top surface of the die defining an open part;
   a stripper defining a through-part, the stripper movably arranged above the die such that the stripper is configured to descend to secure the pouch film between the stripper and the die when the pouch film is seated on the top surface of the die;
   a Blank holder movably disposed within the open part of the die and configured to contact one surface of the pouch film when the pouch film is seated on the top surface of the die, the Blank holder corresponding in size and shape to the open part of the die to guide movement of the Blank holder therethrough; and
   a punch movably disposed within the through-part of the stripper and configured to descend to contact the other surface of the pouch film when the pouch film is seated on the top surface of the die,
   wherein the punch and the Blank holder are configured to secure the pouch film therebetween and to descend together.

8. The pouch molding apparatus of claim 7, further comprising a cylinder that provides a power to the Blank holder to allow the Blank holder to move vertically.

9. The pouch molding apparatus of claim 8, wherein the cylinder is operated by a hydraulic pressure.

10. A pouch molding method comprising:
    a seating step of seating a pouch film on a top surface of a die;
    a stripper descending step of allowing a stripper disposed above the die to descend;
    a fixing step of fixing the pouch film between the stripper and the die;
    a molding preparation step of descending a Blank holder through a portion of the stripper and into contact with one surface of the pouch film and ascending a punch through a portion of the die until the punch is flush with the top surface of the die and in contact with the other surface of the pouch film; and a molding step of allowing the punch and the Blank holder to ascend together to form a cup part in the pouch film.

11. The pouch molding method of claim 10, wherein the molding preparation step is performed in an order of:
a step of allowing the Blank holder to descend;
a step of allowing the Blank holder to contact the one surface of the pouch film;
a step of allowing the punch to ascend; and
a step of allowing the punch to contact the other surface of the pouch film.

12. The pouch molding method of claim 10, wherein the molding preparation step is performed in an order of:
a step of allowing the punch to ascend;
a step of allowing the punch to contact the other surface of the pouch film;
a step of allowing the Blank holder to descend; and
a step of allowing the Blank holder to contact the one surface of the pouch film.

13. The pouch molding method of claim 10, wherein, after the molding preparation step, the punch and the Blank holder secure the pouch film therebetween.

14. The pouch molding method of claim 10, wherein a power is provided to the Blank holder by a cylinder to allow the Blank holder to move vertically.

15. The pouch molding method of claim 14, wherein the cylinder is operated by a hydraulic pressure.

16. A pouch molding apparatus comprising:
a die having a top surface upon which a pouch film is configured to be seated, the top surface defining an opening;
a stripper moveably arranged above the die such that the stripper is configured to descend to secure the pouch film between the stripper and the die when the pouch film is seated on the top surface of the die;
a Blank holder movably disposed within a portion of the stripper and configured to descend to contact one surface of the pouch film; and
a punch movably disposed within the die and configured to ascend to contact the other surface of the pouch film, the punch corresponding in size and shape to the opening of the die to guide movement of the punch therethrough,
wherein the punch and the Blank holder are configured to secure the pouch film therebetween and to ascend together.

17. The pouch molding apparatus of claim 16, further comprising a cylinder that provides a power to the Blank holder to allow the Blank holder to move vertically.

18. The pouch molding apparatus of claim 17, wherein the cylinder is operated by a hydraulic pressure.

* * * * *